UNITED STATES PATENT OFFICE.

VITTORIO IMPERATORI, OF ROME, ITALY, ASSIGNOR TO SOCIETÀ ITALIANA PER IL CARBURO DI CALCIO, OF ROME, ITALY.

PROCESS FOR COATING CARBID WITH CALCIUM CYANAMID.

1,081,938.   Specification of Letters Patent.   Patented Dec. 16, 1913.
No Drawing.   Application filed September 14, 1912.   Serial No. 720,360.

*To all whom it may concern:*

Be it known that I, VITTORIO IMPERATORI, a subject of the King of Italy, residing at Rome, Italy, (whose post-office address is Via Condotti No. 11,) have invented a certain new and useful Improvement in Processes for Coating Carbid with Calcium Cyanamid, of which the following is a specification.

In the manufacture and subsequent handling of calcium carbid prior to its use for generating acetylene it is desirable owing to its hydroscopic nature to protect it from atmospheric humidity particularly the smaller particles owing to their large surface of exposure as compared with their small mass which accelerates decomposition.

The present invention has for its principal object a process of treating calcium carbid whereby a remarkable resistance to atmospheric humidity is imparted to same.

A further object of the invention is to so treat calcium carbid that the subsequent generation of acetylene will be retarded, which feature possesses very appreciable advantages in connection with lighting.

According to the present invention particles of calcium carbid while in the presence of nitrogen are brought into contact with a heated wall, whereby the particles become coated with a thin layer of calcium cyanamid, the thickness of the coating being determined according to the duration of the reaction.

In bringing the invention into practice I proceed as follows:—The particles of calcium carbid are caused to fall by suitable means into vessels of a suitable shape and material, capable of being heated to red heat or even a much higher temperature, and to the particles falling into the vessels a movement is imparted so as to bring them rapidly and uniformly into contact with the heated walls. During the heating process the carbid is kept in an atmosphere of air and pure nitrogen which may be previously heated and preferably dried. The nitrogen reacting on the carbid may, of course, be accompanied by other gases of a nature which will not affect the carbid. In these conditions, owing to the known reaction of nitrogen on calcium carbid heated to proper temperature, on the surface of the carbid particles, a more or less deep coating of calcium cyanamid is formed according to the greater or shorter duration of the reaction. Calcium cyanamid, as is known, resists atmospheric agents much better than calcium carbid, so that the thin coating of calcium cyanamid protects the core of the carbid particles against the said atmospheric agents.

When the coated carbid particles are brought into contact with water, the generation of acetylene gas is complete but not so rapid as with uncoated carbid, which obviously is an appreciable advantage in the use of calcium carbid for lighting purposes.

What I claim and desire to secure by Letters Patent of the United States is:—

1. A process of coating calcium carbid with a thin layer of calcium cyanamid leaving a substantial core of calcium carbid adapted for use in generating acetylene which consists in bringing the particles of calcium carbid into contact with a heated wall while in the presence of nitrogen.

2. Calcium carbid having a thin coating of calcium cyanamid for use in generating acetylene.

In testimony whereof I have signed my name to this specification in the presence of two subscribing witnesses.

VITTORIO IMPERATORI.

Witnesses:
 DINLIO NARDONI,
 NICOLA SISTO.